Patented July 18, 1950

2,515,444

UNITED STATES PATENT OFFICE 2,515,444

ALKINE-SO₃ ADDITION PRODUCT

Everett E. Gilbert and Julian A. Otto, New York, N. Y., assignors to Allied Chemical & Dye Corporation, a corporation of New York No Drawing. Application October 26, 1946, Serial No. 706,046

9 Claims. (Cl. 260—327)

This invention relates to manufacture of addition products of alkines and sulfur trioxide, and more particularly to production of the addition product of acetylene and sulfur trioxide.

The invention comprises the discovery of the existence of certain alkine-sulfur trioxide addition products useful as chemical intermediates in the manufacture of other chemical compounds, and the provision of processes for making such addition products.

In accordance with the invention, as exemplified by a preferred embodiment directed to the formation of an acetylene-sulfur trioxide adduct, it has been found that by reacting acetylene with sulfur trioxide constituent of an anhydrous mixture containing sulfur trioxide and liquid sulfur dioxide, there is formed, apparently in solution, a readily recoverable new product having herein described characteristics.

The process of the invention, using acetylene as the alkine, may be carried out in a glass-lined reaction vessel provided with inlets for liquid sulfur trioxide and liquid sulfur dioxide; an inlet for acetylene gas, an outlet for unabsorbed acetylene leading to an acetylene recovery unit; an outlet for gaseous sulfur dioxide connected to a sulfur dioxide liquefier; an agitator; refrigerating equipment to maintain the herein stated low temperatures during the course of the reaction; heating coils for evaporating off sulfur dioxide on completion of the reaction; and preferably suitable means by which the final product can be removed from the reactor to a storage container without permitting the product to come in contact with air.

One aspect of the invention comprises the discovery of a certain solvent and/or reaction medium, namely anhydrous liquid sulfur dioxide, the use of which makes possible the carrying out of the processes of these improvements in such a way as to obtain the products described.

In a representative procedure for practice of the invention, there is first formed in the reaction vessel an anhydrous liquid mixture preferably consisting of sulfur trioxide and liquid sulfur dioxide. The weight ratio of sulfur trioxide to sulfur dioxide in the anhydrous liquid mixture initially formed in the reaction vessel may be within any limits which are such as to facilitate the maintenance of the mass in the reactor in a readily agitatable condition throughout the reaction. In this connection we find that the preliminary sulfur trioxide-sulfur dioxide anhydrous mixture should contain usually not less than 40% by weight of liquid sulfur dioxide relative to the amount of liquid sulfur trioxide present, and in the better forms of practice, it is preferred to increase the sulfur dioxide content to not less than 50% by weight and more. With these features in mind, anhydrous liquid sulfur dioxide and anhydrous liquid sulfur trioxide are run into the reactor in appropriate amounts thru their respective inlets the valves of which are thereafter closed, it being understood that at this time the valves on the acetylene inlet and gaseous sulfur dioxide outlet connections are closed.

Reactions involved in the process of the invention are carried out tetemperatures appreciably below the boiling point of liquid sulfur dioxide at the particular pressure of operation, i. e. appreciably below minus 10° C. when working at substantially atmospheric pressure. Thus, on charging the liquid sulfur trioxide and liquid sulfur dioxide into the reactor, the cooling apparatus is operated to create in the anhydrous mixture in the reactor sufficiently low temperatures. Since subsequent reaction of acetylene and sulfur trioxide generates some heat, before introduction of any acetylene into the reactor, it is more satisfactory to refrigerate the sulfur trioxide-sulfur dioxide mixture to temperatures of say minus 35° C. to minus 50° C. The agitator is then started, and introduction of e. g. acetylene commenced, best results being obtained when the acetylene is bubbled into the bottom of the liquor mass in the reactor by means of a suitable distributor. All during the subsequent addition of acetylene and throughout the course of the reaction, the mass in the reactor is maintained, assuming approximate atmospheric pressure, below about minus 15° C., and preferably in the range of minus 20–30° C. Reaction temperatures as high as minus 10° C. and more may be used if provisions are made to take care of increase of vapor pressure of the sulfur dioxide at such higher temperatures.

Two factors of major importance in practice of the process of the invention are the presence in the reactor of liquid sulfur dioxide and an anhydrous condition in the reaction mass, the term anhydrous being used in the sense to exclude from the reaction mass water in all forms and the presence of materials which may contain water of constitution. When adhering to the foregoing, the preferred new adduct of the invention is apparently formed by reaction of substantially one molecular proportion of acetylene with substantially four molecular proportions of $SO_3$.

On initiation of introduction of acetylene into the sulfur trioxide-sulfur dioxide anhydrous mixture, with good refrigeration and agitation, absorption of acetylene is nearly complete and continues so during the greater part of a run. Rate of charging of acetylene appears to be dependent only upon efficiency of refrigeration. Shortly after feed of acetylene into the liquid sulfur trioxide-sulfur dioxide mixture has commenced, the mass in the reactor takes on a light brownish hue the intensity of which increases as the reaction proceeds to completion. Also, the reaction mass becomes progressively less fluid and viscosity tends to increase substantially as the reaction end point is approached.

In the practice of the more desirable embodiments of the invention, a third factor of major importance is the relative molecular proportions of acetylene to $SO_3$. If less acetylene is used than called for by the above stated 1:4 ratio, yield of adduct (based on $SO_3$ present) is decreased, and it appears that no other significantly deleterious action results. However, the situation changes when appreciably more than one molecular proportion of acetylene is brought into reactive relative relation with 4 molecular proportions of $SO_3$. Our development work shows that the acetylene-$SO_3$ adduct is very reactive and that such adduct reacts with excess acetylene but at a rate which is not as rapid as the rate of reaction between acetylene and original $SO_3$. When the amount of acetylene introduced into the reaction mass is sufficient to supply about one molecular proportion of acetylene to each four molecular proportions of $SO_3$, rate of acetylene absorption drops off greatly but does not cease. Thereafter a relatively dark brown precipitate forms, evidently as a result of reaction between the acetylene-$SO_3$ adduct itself and excess acetylene. To the extent of formation of such precipitate, loss of the preferred acetylene-$SO_3$ adduct product of the invention is effected. According to the best forms of practice of the invention introduction of acetylene should be regulated so as to supply substantially one molecular proportion of acetylene to substantially each four molecular proportions of $SO_3$. However, we find that commercially acceptable results may be obtained when the quantity of acetylene introduced is limited to not more than 1.25 molecular proportions of acetylene to each four molecular proportions $SO_3$, and in general these relative molecular proportions are preferred. There may be instances in which formation of appreciable amounts of precipitate and corresponding reduction of acetylene-$SO_3$ adduct yield are not particularly objectionable, and in this circumstance the amount of acetylene fed into the reaction mass may significantly exceed the preferred 1.25 molecular proportion of acetylene to each four molecular proportions of $SO_3$.

Initiation of formation of precipitate is one indication of the end point of the desired reaction. At the beginning of reaction temperature differential between the cooling jacket and the charge may be high and of the order of 20–30° C. As the reaction nears completion this differential drops off markedly and affords another indication of the end of reaction. However, these manifestations of the end point of reaction need not be depended upon since with suitable equipment proper proportioning of acetylene and $SO_3$ affords no appreciable difficulty.

When reaction has been completed to the desired extent, supply of acetylene gas is shut off and the valve in the pipe connection between the reactor and the acetylene recovery system is closed, and refrigeration is discontinued. If desired, the resulting reacted mass containing the liquid sulfur dioxide may be used as such as an intermediate. However, the adduct is readily recoverable from the reacted mass, and for this purpose the valve in the $SO_2$ gas outlet of the reactor is opened, and sufficient heat is applied to the reactor to evaporate out the sulfur dioxide which thereafter may be liquefied for reuse. Temperatures of the order of 10° C. are sufficient to effect distillation of the sulfur dioxide. The product remaining in the reactor is a brown, viscous, resinous material which has a molasses-like consistency and appearance and which is hygroscopic and fumes when exposed to air at room temperature. We believe and all our investigations indicate that this material has the following probable structural formula

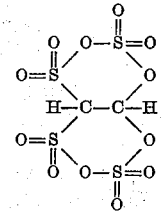

and is the adduct resulting from the reaction of one molecular proportion of acetylene and four molecular proportions of $SO_3$. If any of the aforementioned precipitate has been formed incidentally, such precipitate is contained in the product remaining in the reactor after removal of sulfur dioxide.

The principles of the invention may be employed in connection with the utilization of other alkines, such as mono or di-alkyl substituted acetylenes, in place of acetylene. Such starting materials may be reacted with $SO_3$ under the conditions indicated, and addition products corresponding to that obtained in the case of acetylene may be produced. Substituted acetylene starting materials have the general formula $R—C\equiv C—R'$. Substituent groups R and R' should be resistant to chemical attack under the conditions of the reaction. Alkyl groups preferably straight chain alkyl groups having eight carbon atoms or less adequately fulfill these requirements. According to the invention, R and R' of the starting material general formula are selected preferably from the group consisting of hydrogen and straight-chain alkyl radicals containing not more than eight carbon atoms. From process angle the invention comprises reacting a compound of the general formula $R'—C\equiv C—R'$ when R and R' are selected from the group consisting of hydrogen and straight-chain alkyl radicals containing not more than eight carbon atoms—with sulfur trioxide constituent of an anhydrous mixture containing sulfur trioxide and liquid sulfur dioxide; and the invention also includes the corresponding adduct products having the probable structural formula

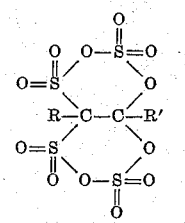

where R and R' are selected preferably from the group consisting of hydrogen and straight-chain alkyl radicals containing not more than eight carbon atoms.

Following are examples of practice of the invention using acetylene as the illustrative alkine, all parts mentioned being parts by weight:

*Example 1.*—Acetylene was slowly passed into an anhydrous mixture initially consisting of 49.0 parts of sulfur trioxide and 55.5 parts of liquid sulfur dioxide maintained at minus 20 to minus 25° C. At first there was complete absorption of acetylene and the solution gradually darkened. After 50 min., the absorption of acetylene slowed down. After 1 hr. and 20 min. the mixture was brownish and syrupy and contained some precipitate since an excess of acetylene was employed. Supply of acetylene was cut off, cooling was discontinued, and temperature was raised to about 10° C. to distill off the sulfur dioxide. There remained in the reaction vessel a brown, viscous, resinous material which had a molasses-like consistency and appearance, and which was hygroscopic and fumed when exposed to air at atmospheric temperature.

*Example 2.*—In a reactor, there was first formed an anhydrous mixture initially consisting of 300 parts of liquid sulfur dioxide, and 49 parts of liquid sulfur trioxide (0.613 mol). The temperature of the mass in the reactor was held in the range of minus 20–30° C. throughout the run. Acetylene was introduced at the rate of 0.040 part per minute. Unabsorbed acetylene passed out of the reaction mass at a rate of about 0.002 part per minute. A total of about 3.98 parts acetylene (0.153 mol) was charged into the reactor during a period of about 1 hour and 45 minutes. In this run, the acetylene to sulfur trioxide mol ratio was about 1 to 4. The resulting product was completely soluble in the sulfur dioxide and no precipitate appeared. Cooling was discontinued, and temperature was raised to about minus 10° C. to distill off the sulfur dioxide. The remaining product was similar in appearance to that described above in Example 1.

We claim:

1. The product corresponding with the structural formula

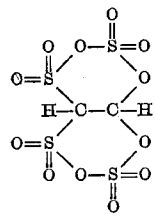

2. The process which comprises forming an anhydrous mixture consisting essentially of sulfur trioxide and liquid sulfur dioxide, said mixture containing not less than 40% by weight of liquid sulfur dioxide, reacting sulfur trioxide of said mixture with acetylene while maintaining temperature below the boiling point of liquid sulfur dioxide, and separating sulfur dioxide from the reaction mass to recover the resultant reaction product.

3. The process which comprises forming an anhydrous mixture consisting essentially of sulfur trioxide and liquid sulfur dioxide, said mixture containing not less than 50% by weight of liquid sulfur dioxide, passing acetylene into said mixture in quantity to provide substantially one mol of acetylene per substantially four mols of sulfur trioxide, while maintaining temperature below minus 15° C., thereafter evaporating off the sulfur dioxide to recover the resulting brownish-colored, viscous, resinous reaction product.

4. The process which comprises reacting acetylene with sulfur trioxide constituent of an anhydrous mixture consisting essentially of sulfur trioxide and liquid sulfur dioxide, while maintaining substantially all of said sulfur dioxide in the liquid phase substantially throughout said reaction.

5. The process which comprises reacting acetylene with sulfur trioxide constituent of an anhydrous mixture consisting essentially of sulfur trioxide and liquid sulfur dioxide, said mixture containing liquid sulfur dioxide in amount such as to facilitate maintenance of the reaction mass in an agitatable condition substantially throughout the reaction, agitating said mass during the reaction, and maintaining substantially all of said sulfur dioxide in the liquid phase substantially throughout said reaction.

6. The process which comprises reacting acetylene with sulfur trioxide constituent of an anhydrous mixture consisting essentially of sulfur trioxide and liquid sulfur dioxide, said mixture containing liquid sulfur dioxide in amount such as to facilitate maintenance of the reaction mass in an agitatable condition substantially throughout the reaction, agitating said mass during reaction, maintaining substantially all of said sulfur dioxide in the liquid phase substantially throughout said reaction, and thereafter separating the sulfur dioxide from the reaction mass to recover the resultant reaction product.

7. The process which comprises reacting not more than 1.25 mols of acetylene with substantially four mols of the sulfur trioxide constituent of an anhydrous mixture consisting essentially of sulfur trioxide and liquid sulfur dioxide, said mixture containing liquid sulfur dioxide in an amount such as to facilitate maintenance of a reaction mass in an agitatable condition substantially throughout the reaction, agitating said mass during the reaction, and maintaining substantially all of said sulfur dioxide in the liquid phase substantially throughout said reaction.

8. The process which comprises reacting substantially one mol of acetylene with substantially four mols of the sulfur trioxide constituent of an anhydrous mixture consisting essentially of sulfur trioxide and liquid sulfur dioxide, said mixture containing liquid sulfur dioxide in amount such as to facilitate maintenance of a reaction mass in an agitatable condition substantially throughout the reaction, agitating said mass during reaction, maintaining substantially all of said sulfur trioxide in the liquid phase substantially throughout said reaction, and thereafter separating the sulfur dioxide from the reaction mass to recover the resultant reaction product.

9. The brownish colored, viscous, resinous addition product of acetylene and sulfur trioxide, the composition of which product corresponds substantially with from about one to not more than 1.25 mols acetylene per 4 mols of sulfur trioxide.

EVERETT E. GILBERT.
JULIAN A. OTTO.

REFERENCES CITED

The following references are of record in the file of this patent:

UNITED STATES PATENTS

| Number | Name | Date |
| --- | --- | --- |
| 1,913,794 | Daimler | June 13, 1933 |
| 2,138,584 | Marvel | Nov. 29, 1938 |
| 2,219,748 | Nawiasky | Oct. 29, 1940 |
| 2,365,783 | Suter | Dec. 26, 1944 |

FOREIGN PATENTS

| Number | Country | Date |
| --- | --- | --- |
| 550,572 | Germany | May 12, 1932 |